Patented June 30, 1942

2,288,418

UNITED STATES PATENT OFFICE 2,288,418

MANUFACTURE OF MIXED PHOSPHATES

Everett P. Partridge, Beaver, Pa., assignor to Hall Laboratories, Inc., Pittsburgh, Pa., a corporation of Pennsylvania No Drawing. Application November 1, 1939, Serial No. 302,345

5 Claims. (Cl. 23—106)

This invention relates to the manufacture of mixed phosphates suitable for use as fertilizers or for other purposes and more particularly to the manufacture of water soluble glassy mixed molecularly dehydrated phosphates from a mixture of potassium chloride, sodium chloride and phosphoric acid.

This application is a continuation-in-part of my co-pending application, Serial No. 132,519, filed March 23, 1937.

At the present time phosphate fertilizer materials comprise chiefly crude phosphate rock or acid calcium phosphates made therefrom by treatment with sulphuric or hydrochloric acids. Potash fertilizer materials comprise naturally occurring mixtures of potassium chloride with sodium chloride and other substances, refined potassium chloride derived from the natural mixtures, and potassium sulphate made by further processing of the refined potassium chloride. In the case of both the phosphate and the potash materials, the components valuable from the standpoint of plant growth are combined with other components which either have no fertilizing value or are definitely disadvantageous, such as the chloride present to a large extent in most potash salts.

For many years there has been a trend towards the use of fertilizers containing increasing concentrations of the three major constituents, potash, phosphorus and nitrogen. More recently, the distribution of fertilizer materials in solution in irrigation water has been developed, and a process of growing plants with their roots in tanks containing a desirable nutrient solution has been employed. Particularly in these latter instances is it desirable to add to the irrigation water or to the water in the tanks only such soluble substances as are actually effective fertilizers. However, even where fertilizers are added to the soil in the traditional manner, materials highly concentrated with respect to the desired chemical elements are desirable, since thereby the cost of transportation on inert and valueless constituents is eliminated.

In the United States, in addition to large reserves of phosphate rock which have been utilized for many years as fertilizer material, there are great deposits of potash salts in the Permian basin of the Southwest. In these deposits have been found beds of sylvinite, a mechanical mixture of potassium chloride and sodium chloride containing up to 40% or more of potassium chloride, which is equivalent to about 25% or more of $K_2O$. As set forth in the U. S. Department of Commerce, Bureau of Mines Bulletin 327, "Potash Bibliography to 1928," by J. F. T. Berliner, on page 457, article 3470, the KCl content of sylvinite may be as high as 40 to 50% or as low as about 10%. This same publication on page 7 describes sylvinite as principally a mixture of sylvite and halite and usually contains from 20 to 60% KCl. On page 528 of this publication, referring to article 3953, sylvinite is stated to contain from about 18 to 44% KCl. On page 299, under article 2274, a sylvinite containing 20 to 24% KCl is disclosed; and on page 386, article 2959 describes sylvinite deposits with an average content of $K_2O$ of 20%, which corresponds to a KCl content of about 32%. It is thus seen that the KCl in sylvinite may range from about 10 to about 60% by weight. At the present time, both the crude sylvinite and potassium chloride produced from it are being used as fertilizer salts.

The potassium chloride is a valuable fertilizer constituent, due to its potassium content, but it is evident that if the potassium chloride could be converted into a phosphate of potassium the product would be more valuable as a fertilizer because of its content of both $K_2O$ and $P_2O_5$. If it is attempted to convert the refined potassium chloride into potassium metaphosphate by fusing a mixture of potassium chloride and phosphoric acid, certain difficulties are encountered both as to the process and as to the character of the product. The fusion point of the potassium metaphosphate made with refined potassium chloride is very high, a temperature above 800° C. being required to obtain a clear melt. This high furnace temperature produces high rate of wear on the furnace parts and requires a considerable expenditure for fuel. If the melt is allowed to cool normally, it results in a crystalline potassium metaphosphate which is only very slightly soluble in water and, therefore, is not well adapted for use as a fertilizer or for any other uses in which water solubility is required. It is possible to produce glassy potassium metaphosphate which is water soluble but in order to do this it is necessary that the melt be very rapidly chilled in the form of very thin flakes, as between rotating rolls. The high temperature required to fuse the melt of potassium metaphosphate and the drastic chilling required to maintain it in glassy form are serious disadvantages to the production and use of potassium metaphosphate. It will be understood that, although crystalline potassium metaphosphate may be made without drastic chilling of the melt, it is practically insoluble in water.

I have found that mixed sodium and potassium metaphosphates or other mixtures of molecularly dehydrated sodium and potassium phosphates may be made by starting with a mixture of sodium and potassium chloride and reacting the chlorides with phosphoric acid and that the use of a mixture of sodium and potassium chloride as contrasted with the use of potassium chloride alone has several important advantages. I have found that the mixture of potassium chloride, sodium chloride and phosphoric acid melts at a considerably lower temperature to produce a clear melt and that the melt of a mixture of sodium and potassium metaphosphates resulting from the fusion of the sodium chloride, potassium chloride and phosphoric acid, may be maintained in its glassy form by chilling the melt less drastically than would be required in the production of potassium metaphosphate.

In carrying out the process for producing glassy mixed sodium and potassium metaphosphates, I may start with a mixture of sodium chloride, potassium chloride and phosphoric acid. The mixture is heated to a temperature sufficient to fuse it so as to produce a clear melt and to drive off substantially all of the water of constitution. The melt is then rapidly cooled, in order to retain the melt in glassy form. The fusion temperature is lower than required for fusing potassium metaphosphate alone and the rapidity of chilling required for maintaining the melt in a glassy water soluble condition is considerably less.

It is possible according to my invention to make glassy mixed molecularly dehydrated phosphates of different chemical compositions. Thus for a given ratio of KCl to NaCl in the crude salts the ratio of phosphoric acid to total chloride may be varied within moderate limits or for a given ratio of phosphoric acid to total chlorides, crude salts having various ratios of NaCl to KCl may be employed. If I wish to produce mixed sodium and potassium metaphosphate, I use in the starting mixture a molar ratio of total chlorides (NaCl+KCl) to phosphoric acid of about 3:3. On the other hand, if I wish to produce a mixture corresponding to the tripolyphosphate composition $M_5P_3O_{10}$ (where M represents sodium and potassium), I use in the starting mixture a ratio of total chlorides to phosphoric acid of about 5:3. If I wish to produce mixtures having compositions intermediate the metaphosphate and tripolyphosphate compositions, I use in the starting mixture a ratio of total chlorides to phosphoric acid intermediate the ratios required for producing the metaphosphates and the tripolyphosphates. I have found, however, that as the ratio of total chlorides to phosphoric acid is increased the decomposition obtainable within a particular period of time decreases and the products as a result contain more residual chloride. Decomposition proceeds rapidly and nearly to completion for mixtures comprising up to 1 mol or somewhat more total chloride to 1 mol of phosphoric acid. Thus in the production of mixed sodium and potassium metaphosphates the decomposition is rapid and practically complete. In the production of the tripolyphosphate composition, the decomposition is not as rapid or complete as in the production of the metaphosphates. When 2 mols of total chloride are used for 1 mol of phosphoric acid in the initial mixture, a considerable part of the chlorides remain undecomposed. It might be thought that when 2 mols of total chloride are used for 1 mol of phosphoric acid, these being the proportions theoretically required for the production of the pyrophosphates, the resultant product would be a mixture of sodium and potassium pyrophosphates. In actual practice, however, the pyrophosphates are not formed to any appreciable extent and the only result of using a ratio of total chlorides to phosphoric acid higher than 5:3 is to produce a product containing the tripolyphosphate composition and undecomposed sodium and potassium chlorides. Where the product contains undecomposed chlorides, the temperature of fusion is increased and it becomes more difficult to maintain the product in glassy form by chilling. As the amount of undecomposed sodium and potassium chloride increases, the melting point and the rapidity of chilling in order to preserve the glassy condition increase. Where the ratio of total chlorides to phosphoric acid is materially above 6:3, the difficulties of melting, and cooling rapidly enough, become so great that it is not commercially feasible to produce a glassy product. According to my invention, the molar ratio of total chlorides to phosphoric acid is maintained not substantially more than 6:3. This enables the production of glassy molecularly dehydrated phosphates without resort to too high melting temperatures or to drastic chilling of the melt. I prefer, however, that the ratio of total chlorides to phosphoric acid be not more than about 5:3, which would produce the tripolyphosphate composition. Specifically, I prefer that the ratio of total chlorides to phosphoric acid be in the neighborhood of 3:3, in order to produce the mixed metaphosphates of sodium and potassium.

The ratio of potassium chloride to sodium chloride in the starting mixture also is important in producing the glassy molecularly dehydrated mixed phosphates. The higher the ratio of potassium chloride to sodium chloride, the higher is the fusion point and the more drastic is the chilling required to maintain the product in glassy form. The potassium chloride should not exceed 75% by weight and the sodium chloride should not be less than 25% by weight of the mixture of potassium and sodium chlorides. A mixture containing 75% potassium chloride and 25% sodium chloride has a molar ratio of potassium chloride to sodium chloride of about 2.3:1. Although the molar ratio of potassium chloride to sodium chloride may be up to 2.3:1, it is preferred that the ratio of potassium chloride to sodium chloride be not more than 1:1. This ratio of 1:1 corresponds to a mixture containing about 56% potassium chloride and 43% sodium chloride by weight. A mixture of potassium chloride and sodium chloride containing 10% KCl and 90% NaCl has a molar ratio of KCl to NaCl of about 0.1:1.

The temperature required to produce a completely fused melt will depend upon the mixture employed; but for a ratio of up to 5 mols of total chloride to 3 mols of phosphoric acid and of up to 1 mol of potassium chloride to 1 mol of sodium chloride in the mixed chlorides, a temperature of not more than 650° C. will suffice. The glassy product obtained by rapidly cooling such melt is a mixture of sodium and potassium molecularly dehydrated phosphates, such as sodium and potassium metaphosphates, compositions corresponding to tripolyphosphates or mixtures of metaphosphate and tripolyphosphate. The mixed molecularly dehydrated phosphates are of the same class as the well known glassy sodium hexametaphosphate frequently referred to as Graham's salt and have the property of sequestering calcium in a soluble complex when used in water softening or for other purposes. Thus the present invention is not limited to the production of fertilizers but comprehends the production of mixed molecularly dehydrated glassy phosphates having properties similar to those of Graham's salt, irrespective of the use of these mixed molecularly dehydrated glassy phosphates.

As the source of the starting mixture of potassium and sodium chloride, it is preferred to use the naturally occurring crude potash salts, such as the sylvinite, which has been referred to previously. These mixed phosphates are thoroughly suitable for use in the production of fertilizer salts in spite of any small content of residual chloride resulting from incomplete decomposition of the original crude salts or of other impurities present in the crude salts used as the starting material. An additional advantage of the process is that the hydrogen chloride resulting from the reaction may be readily recovered by known means as hydrochloric acid, which may be utilized in associated processes, such as the production of commercial superphosphate fertilizers.

The use of crude natural mixtures of potassium and sodium chlorides rather than of refined potassium chloride is advantageous since the cost of separating the two chlorides is obviated. Furthermore, since greater quantities of $P_2O_5$ than of $K_2O$ must in general be supplied to growing plants, as evidenced by the fact that commercial fertilizers contain, on the average, twice as much $P_2O_5$ as $K_2O$, the use of the mixed chlorides is again an advantage. The amount of $Na_2O$ in the product will not be a disadvantage unless natural salts of low grade are to be utilized. In such a case, however, the ratio of potassium to sodium chloride may be increased by using some higher-grade salts or even refined potassium chloride with the low-grade salts.

In the decomposition of the mixed chlorides, phosphoric acid of any convenient strength may be employed, either the relatively concentrated acid produced by the electric-furnace or blast-furnace processes, or the more dilute acid derived from the treatment of phosphate rock with sulphuric acid. In the latter case, however, more water must be vaporized during the process, and this water vapor will dilute the hydrogen chloride leaving the process, thus lowering the concentration of any hydrochloric acid directly recovered.

The product thus far described is a mixture of glassy sodium and potassium molecularly dehydrated phosphates, this glassy product being obtained by rapid chilling of the melt to maintain the glassy character. If it is desired to produce a crystalline product, the melt is made in the same way as has already been described but the melt is cooled more slowly. This results in a mixture of crystalline sodium and potassium molecularly dehydrated phosphates. Another way of producing crystalline mixed molecularly dehydrated phosphates is to heat the glassy mixture of sodium and potassium molecularly dehydrated phosphates to a temperature below the fusion point of the crystalline mixture to be produced. The temperature to which the glassy phosphates are heated to produce the crystalline phosphates is well below the temperature at which the mixture of crystalline phosphates can melt, and is in the neighborhood of 300 to 500° C.

It is well known that relatively small amounts of a number of chemical elements other than nitrogen, potassium and phosphorus are essential to the proper development of plants. While some of these may be present as impurities in the starting materials employed in my process, if they are not they may conveniently be added to the reaction mixture in the form of suitable compounds. Thus, compounds of iron, aluminum, calcium, magnesium, copper, or any other desired element, may be used in small amounts. By incorporating such compounds in the initial mixture, the desired elements will be distributed throughout the resulting product.

An advantage of both the glassy and the crystalline mixtures of potassium and sodium metaphosphates is the fact that any compounds added in small amounts as described above will not be precipitated when the metaphosphate mixture is dissolved in water, as would be the case with the orthophosphates commonly employed as phosphate fertilizers.

The products which have been described are suitable not only for use as fertilizer salts, but also as industrial chemicals for purposes where a high-purity material is not required.

In the preferred practice of my invention, potassium and sodium chlorides are used with phosphoric acid in the proportion of about 1 mol of total chlorides to 1 mol of phosphoric acid, in order to produce a mixture of glassy sodium metaphosphate and potassium metaphosphate.

However, the molar ratio of total chlorides to phosphoric acid may be either more or less than 1:1, depending upon the particular molecularly dehydrated phosphate or phosphates which it is desired to produce as the final product.

It is to be understood that the invention is not limited to the preferred procedure which has been described but may be otherwise embodied or practiced within the scope of the following claims.

I claim:

1. A process of making water soluble glassy mixed molecularly dehydrated phosphates, which comprises heating to a temperature above fusion and sufficient to drive off substantially all of the water of constitution a mixture containing potassium chloride, sodium chloride and phosphoric acid in the ratio of not more than 6 mols of total chloride to 3 mols of phosphoric acid and from about 0.1 to not more than 2.3 mols of potassium chloride to 1 mol of sodium chloride, and rapidly chilling the fused material.

2. A process of making water soluble glassy mixed molecularly dehydrated phosphates, which comprises heating to a temperature above fusion and sufficient to drive off substantially all of the water of constitution a mixture containing potassium chloride, sodium chloride and phosphoric acid in the ratio of not more than 6 mols of total chloride to 3 mols of phosphoric acid and from about 0.1 to not more than 1 mol of potassium chloride to 1 mol of sodium chloride, and rapidly chilling the fused material.

3. A process of making water soluble glassy mixed molecularly dehydrated phosphates, which comprises heating to a temperature above fusion and sufficient to drive off substantially all of the water of constitution a mixture containing potassium chloride, sodium chloride and phosphoric acid in the ratio of not more than 5 mols of total chloride to 3 mols of phosphoric acid and from about 0.1 to not more than 2.3 mols of potassium chloride to 1 mol of sodium chloride, and rapidly chilling the fused material.

4. A process of making water soluble glassy mixed molecularly dehydrated phosphates, which comprises heating to a temperature above fusion and sufficient to drive off substantially all of the water of constitution a mixture containing potassium chloride, sodium chloride and phosphoric acid in the ratio of not more than 5 mols of total chloride to 3 mols of phosphoric acid and from about 0.1 to not more than 1 mol of potassium chloride to 1 mol of sodium chloride, and rapidly chilling the fused material.

5. A process of making water soluble glassy mixed sodium and potassium metaphosphates, which comprises heating to a temperature above fusion and sufficient to drive off substantially all of the water of constitution a mixture containing potassium chloride, sodium chloride and phosphoric acid in the ratio of about 3 mols of total chloride to 3 mols of phosphoric acid and from about 0.1 to not more than 2.3 mols of potassium chloride to 1 mol of sodium chloride, and rapidly chilling the fused material.

EVERETT P. PARTRIDGE.